United States Patent Office 3,508,431
Patented Apr. 28, 1970

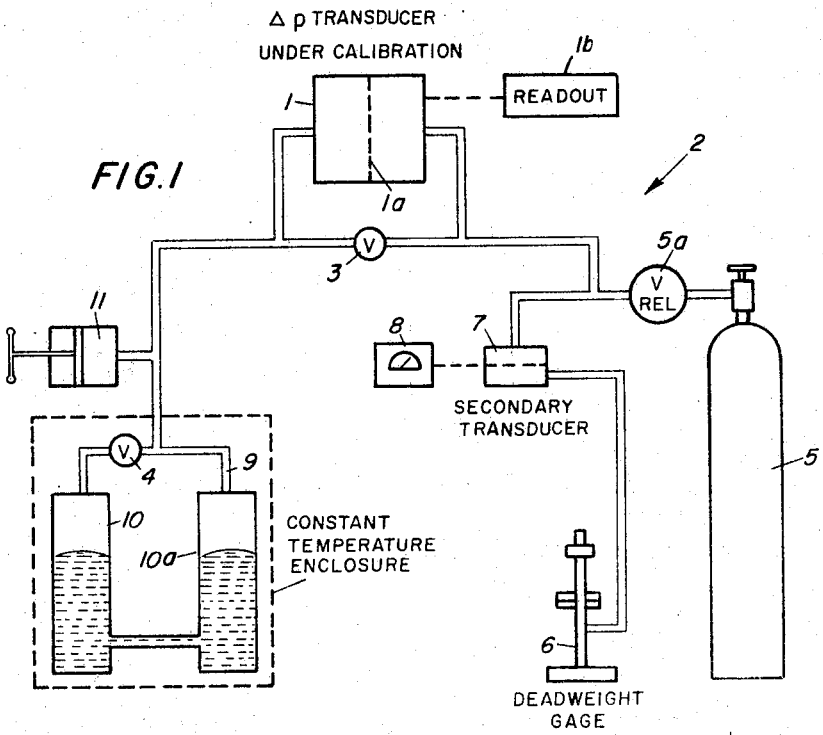
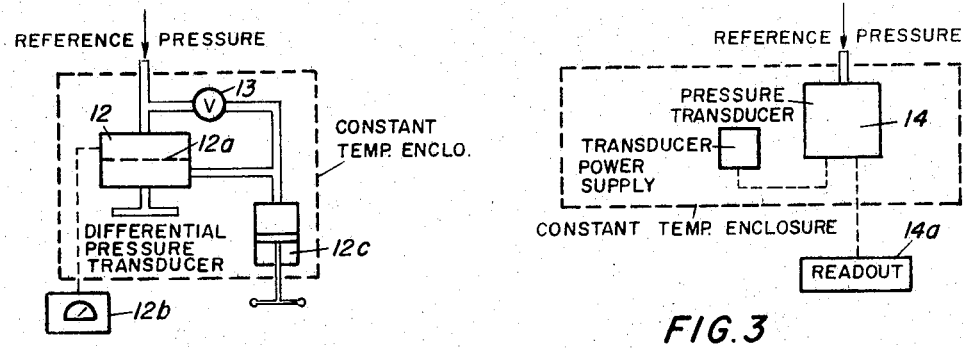
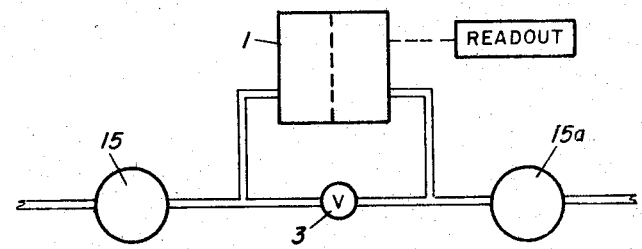

3,508,431
SYSTEM FOR CALIBRATION OF A DIFFERENTIAL PRESSURE TRANSDUCER
Horace P. Richardson and John L. Gordon, Amarillo, Tex., assignors to the United States of America as represented by the Secretary of the Interior
Filed Sept. 5, 1968, Ser. No. 757,626
Int. Cl. G01l 27/00
U.S. Cl. 73—4         11 Claims

ABSTRACT OF THE DISCLOSURE

A first conduit, having a gas supplier and deadweight gage, is attached adjacent one side of a $\Delta p$ transducer sensor. A volumetrically-controlled second conduit, having a pressure monitor and valved connection with the first conduit, is attached adjacent the other side of the sensor. The conduits are maintained in fluid connection with one another and the gas supplier produces a first pressure throughout both conduits which is precisely measured with the deadweight gage. The conduits are then disconnected and the gas supplier is employed to increase the pressure only in the first conduit to establish a differential across the sensor. Any pressure deviation in the second conduit from the first pressure is corrected, and the new pressure in the first conduit is then measured with the deadweight gage. The difference between the first and new pressures is calculated and compared to the value shown on the transducer readout.

---

This invention, which relates to the calibration of differential pressure transducers, resulted from work done by the Bureau of Mines in the United States Department of the Interior, and domestic title to the invention is in the Government.

Differential pressure ($\Delta p$) measurement is an important tool in many fields of science and industry. Areas of use include flow and viscosity measurement, system pressure balance, and process control such as petroleum production.

During the past decade transducers have been developed to provide more accurate $\Delta p$ measurements than previously obtainable. Most of the $\Delta p$ transducers currently available are similar in design to widely used pressure transducers. Regardless of the type (potentiometric, capacitive, magnetic, piezoresistive, etc.), a force-balance sensor is displaced relative to the pressure applied, and the displacement is detected and transduced into an analog electrical signal which can be monitored directly and/or used to activate an auxiliary readout circuit.

One of the advantages of $\Delta p$ transducers is that they generally have infinite resolution. That is, they are responsive to infinitely small changes in pressure. Further, these devices offer adequate precision with regard to a range of differential pressures for a given general pressure within which the $\Delta p$ occurs. However, they do not produce the same output response for the same $\Delta p$ if the general pressure of the environment in which the $\Delta p$ occurs is varied. This shifting response to the same $\Delta p$ can cause serious errors. As a result, it is necessary to calibrate the transducers under various general pressures if highly accurate measurements are desired.

Several procedures and devices have heretofore been developed for such calibration purposes, but none provide highly accurate calibrations for transducers employed to detect differential pressures of 50 p.s.i. or more occurring within very high pressure environments (e.g., several thousand p.s.i.). We have now developed such a calibration system. Generally, our invention comprises (1) establishing the same generally predetermined pressure on both sides of the sensor of the transducer to be calibrated, and taking a deadweight gage measurement to precisely determine this pressure which is termed the reference pressure; (2) changing the pressure on only one side of the sensor to establish a generally predetermined new pressure on said one side whereby a pressure differential is produced across the sensor; (3) employing the same deadweight gage used in determining the reference pressure to precisely determine the new pressure; (4) calculating the difference between the reference pressure and new pressure which precisely gives the $\Delta p$ produced across the transducer sensor; and (5) comparing this precisely determined $\Delta p$ with the $\Delta p$ shown on the transducer readout instrument. For complete calibration of the transducer, this procedure, of course, is repeated many times over a wide range of differential pressures within many different general pressure environments.

Each of the instruments employed in the combination of instruments required to accomplish the calibration is readily available. Generally, the apparatus includes (a) a first conduit system on one side of the transducer sensor; (b) a second conduit system on the other side of the sensor; (c) a valved-conduit connecting these two systems; (d) a gas supply tank and deadweight gage means connected to the first conduit system; and (e) a volume control device (such as a piston-cylinder combination) and a pressure measuring device connected to the second conduit system.

It is therefore an object of the present invention to provide a novel $\Delta p$ transducer calibration system. Another object is to provide a $\Delta p$ transducer calibration system which is highly accurate over a wide range of pressure environments (e.g., 0–5000 p.s.i.a.) in which the $\Delta p$ occurs. A further object is to provide such a calibration system which is highly accurate for differential pressures of 50 p.s.i. or more occurring within a wide range of environmental pressures including pressures of several thousand p.s.i.

Other objects and advantages will be obvious from the following more detailed description of the invention taken in conjunction with drawings in which:

FIG. 1 is a schematic view of the calibration system of the present invention.

FIG. 2 is an alternative embodiment of the pressure monitor 9 shown in FIG. 1.

FIG. 3 is another alternative embodiment of the pressure monitor 9 shown in FIG. 1.

FIG. 4 is a partial view of a modification of the system shown in FIG. 1.

Referring to FIG. 1 $\Delta p$ transducer 1 (which is to be calibrated) having a sensor 1a and readout instrument 1b is connected to and placed in fluid communication with calibration system 2. By-pass valves 3 and 4 in the system are opened and a quantity of gas is supplied, via gas supply tank 5 and pressure regulator-bleed valve 5a, into the conduits of system 2 to establish the same generally predetermined pressure throughout the system.

Weights are then adjusted on deadweight gage 6 (e.g., a rotating piston, oil type gage) to exactly counterbalance the calibration system pressure exerted against the sensor of secondary $\Delta p$ transducer 7 so that null detector 8, which is connected to transducer 7, has a zero reading. A deadweight gage reading is then taken and recorded which represents the pressure throughout the system. This recorded value is termed the reference pressure.

Thereafter, by-pass valves 3 and 4 are closed, and the pressure is predeterminatively changed only in the conduit system to the right of valve 3 and sensor 1a (as shown). This change is accomplished by means of tank 5 and regulator 5a. Since the pressure in the conduit system to the left of valve 3 and sensor 1a (the left section of the system) is essentially the same as the reference pressure originally established throughout the system, the change of pressure to the right of valve 3 and sensor 1a (the right section of the system) produces a generally predetermined pressure differential across sensor 1a in transducer 1. Time is then allowed for temperature stabilization in the system after which deadweight gage 6, in conjunction with transducer 7 and null detector 8, is used to precisely determine the new pressure in the right section of the system.

If the deflection of sensor 1a produced by the established pressure differential across the sensor is of such magnitude so as to cause a slight pressure deviation in the left section of the system, then this deviation will be detected by pressure monitor 9 which is a manometer maintained in a constant temperature enclosure in the left section. That is, the previous closing of valve 4 (along with valve 3) had fixed the gas pressure in leg 10 of manometer monitor 9 at a quantity exactly equal to the recorded reference pressure. At that time, this same pressure was also fixed in manometer leg 10a so that the level of liquid in both legs was the same. If the pressure change in the right section of the system changes the pressure in the left section by means of deflection of sensor 1a in transducer 1, then this change will show up in leg 10a of the manometer and will displace the liquid level in leg 10a relative to the liquid level in leg 10 (the gas pressure in leg 10 still being exactly equal to the reference pressure).

If such a change in pressure occurs in the left section of the system after the change in pressure in the right section, volumetric hand pump 11 in the left section is then adjusted to change the pressure in the left section so that the gas pressure in leg 10a of the manometer exactly equals the gas pressure in leg 10 whereby the pressure in the entire left section again exactly equals the recorded reference pressure.

After these adjustments have been made with volumetric hand pump 11, a final confirmation reading is made on deadweight gage 6 in the right section of the system, and the reading is recorded which represents the new pressure in the right section of the system. This new pressure is termed the working pressure.

The actual $\Delta p$ across sensor 1a in transducer 1 is the difference between the recorded reference and working pressures after each reading has been corrected for deadweight gage cylinder temperature, weight buoyancy and local gravity. As such, the $\Delta p$ calibration accuracy is a function of the accuracy of the deadweight gage cylinder area and the differential mass, as opposed to total mass values used to individually determine the reference and working pressures. This differential value is correlated or compared (e.g., graphwise or chartwise) with the value shown on readout instrument 1b for $\Delta p$ transducer 1.

In FIG. 2 is shown an alternative embodiment of the pressure monitor 9 in the left section of the system. Therein a differential pressure transducer 12 is employed as a monitor. When the reference pressure is established in the system, valve 13 is also opened so that the pressure on each side of the sensor 12a of transducer 12 is equal whereby null detector 12b reads zero. When valve 13 is then closed (along with valve 3), any deviation from the zero reading on detector 12b (caused by movement of valve 13) is corrected back to zero by means of volumetric hand pump 12c. At this point, the captive gas on the lower side of sensor 12a (as shown) exerts a pressure exactly equal to the reference pressure. If the new pressure subsequently established in the right section of the calibration system has any effect on the left section, then null detector 12b again will deviate from its zero reading. As in the case with the use of a manometer as a monitor, hand pump 11 in the left section of the system is employed to adjust the pressure in the left section so that null detector 12b again has a zero reading whereby the pressure in the entire left section of the system is exactly equal to the reference pressure.

FIG. 3 shows another alternative embodiment of pressure monitor 9 wherein a pressure transducer 14 is employed as monitor. If the pressure change in the right section of the calibration system causes any pressure change in the captive gas in the left section, then this change will show up on transducer readout instrument 14a. It is then only a matter of adjusting volumetric hand pump 11 to change the value on readout instrument 14a back to the value first shown therein prior to the pressure change in the right section of the system.

Other modifications can be employed in the calibration system such as the use of a liquid, rather than a gas, as the pressure medium throughout the system. Further, referring to FIG. 4 piston-operated ballast tanks 15 and 15a can be employed as volume control means in both the left and right sections of the system. Such a ballast tank 15 in the left section could be employed in place of hand pump 11, while a ballast tank 15a in the right section enables further control (including reduction) of the magnitude of the generally desired working pressure or reference pressure.

With proper deadweight gage techniques on a master pressure standard gage having at least 0.01 percent accuracy, and with a pressure monitor as shown in FIG. 1 or FIG. 2 which is precise to 0.001 p.s.i.a., $\Delta p$ measurement accuracies of 0.01 percent are routinely obtainable with the system of the present invention for differential pressures of 50 p.s.i. or more. The 50 p.s.i.a. limitation results from the 0.005 p.s.i. minimum sensitivity usually found in the most sensitive deadweight gage.

A monitor arrangement as shown in FIG. 3 is generally capable of only 0.01 p.s.i.a. useful resolution. That is, it does not respond in a precise way to pressure changes of less than 0.01 p.s.i. As such, 0.01-percent accurate differential calibrations while employing such a device are limited to differential pressures of 100 p.s.i. or more. If 0.1 percent accuracy is permissible, this device can be used for differential pressures of 50 p.s.i. or more.

What is claimed is:

1. A process for calibrating a $\Delta p$ transducer comprising:
    (a) establishing the same first pressure on both sides of the sensor of said transducer;
    (b) determining said first pressure with a deadweight gage;
    (c) changing the pressure to a second pressure only on one side of said sensor to established a pressure differential across said sensor;
    (d) determining, on the other side of said sensor, any pressure deviation from said first pressure, said determination being made after said second pressure is established on said one side;
    (e) correcting said any pressure deviation on said other side to re-establish said first pressure; and
    (f) determining said second pressure with said deadweight gage.

2. An apparatus for calibrating a $\Delta p$ transducer comprising:
    (a) first conduit means adjacent and in fluid communication with one side of the sensor of said transducer;
    (b) second conduit means adjacent and in fluid communication with the other side of said sensor;
    (c) valve-controlled conduit means connecting said first and second conduit means;
    (d) fluid supply means connected to and in fluid communication with said first conduit means;
    (e) deadweight gage means connected to said first conduit means to determine fluid pressure in said first conduit means; said deadweight gage means comprising
        a secondary differential pressure transducer, one side of the sensor of which is adjacent and in fluid communication with said first conduit means;
        a deadweight gage adjacent and in fluid communication with the other side of the sensor of said secondary transducer; and a null detector connected to said secondary transducer;

(f) volumetric control means connected to and in fluid communication with said second conduit means; and (g) fluid pressure measuring means connected to and in fluid communication with said second conduit means.

3. The apparatus of claim 2 wherein said pressure measuring means connected to said second conduit means is maintained in a constant temperature enclosure.

4. The apparatus of claim 3 wherein said volumetric control means connected to said second conduit means comprises ballast tank means.

5. The apparatus of claim 3 wherein said volumetric control means connected to said second conduit means comprises volumetric hand pump means.

6. The apparatus of claim 5 wherein said fluid supply means connected to said first conduit means comprises gas tank means having pressure regulator means.

7. The apparatus of claim 6 wherein said pressure measuring means connected to said second conduit means is a manometer, both legs of which are connected to and in fluid communication with said second conduit means, and wherein one of said legs is connected to said second conduit means through a valved conduit.

8. The apparatus of claim 7 wherein said valved conduit includes a volumetric hand pump between said valve means and said one side of said sensor of said latter transducer.

9. The apparatus of claim 6 wherein said pressure measuring means connected to said second conduit means is a differential pressure transducer connected to a null detector, both sides of the sensor of said latter transducer being connected to and in fluid communication with said second conduit means, and wherein one of said sides of said sensor is connected to said second conduit means through a valved conduit having valve means.

10. The apparatus of claim 6 wherein said first conduit means further includes volumetric control means.

11. The apparatus of claim 6 wherein said pressure measuring means connected to said second conduit means comprises pressure transducer means.

References Cited

UNITED STATES PATENTS

| | | | |
|---|---|---|---|
| 2,957,334 | 10/1960 | Essmann. | |
| 3,262,305 | 7/1966 | Dawley | 73—4 |
| 3,398,570 | 8/1968 | Cowan et al. | 73—4 |

S. CLEMENT SWISHER, Primary Examiner

H. C. POST III, Assistant Examiner